US012333297B2

(12) United States Patent
Choi et al.

(10) Patent No.: US 12,333,297 B2
(45) Date of Patent: Jun. 17, 2025

(54) DEVICE AND METHOD FOR CONTROLLING OTA UPDATE OF VEHICLE

(71) Applicants: Hyundai Motor Company, Seoul (KR); Kia Corporation, Seoul (KR)

(72) Inventors: Sun Ho Choi, Gyeonggi-Do (KR); Keyng Bin Im, Chungcheongnam-Do (KR)

(73) Assignees: Hyundai Motor Company, Seoul (KR); Kia Corporation, Seouil (KR)

( * ) Notice: Subject to any disclaimer, the term of this patent is extended or adjusted under 35 U.S.C. 154(b) by 0 days.

(21) Appl. No.: 18/678,408

(22) Filed: May 30, 2024

(65) Prior Publication Data

US 2024/0319985 A1 Sep. 26, 2024

Related U.S. Application Data

(63) Continuation of application No. 17/587,893, filed on Jan. 28, 2022, now Pat. No. 12,026,499.

(30) Foreign Application Priority Data

Jun. 25, 2021 (KR) ........................ 10-2021-0083397

(51) Int. Cl.
| | | |
|---|---|---|
| G06F 8/65 | (2018.01) | |
| B60R 16/033 | (2006.01) | |
| B60W 50/00 | (2006.01) | |
| G07C 5/00 | (2006.01) | |

(52) U.S. Cl.
CPC .............. *G06F 8/65* (2013.01); *B60R 16/033* (2013.01); *B60W 50/00* (2013.01); *G07C 5/008* (2013.01); *B60W 2050/0083* (2013.01); *B60W 2510/244* (2013.01); *B60W 2556/45* (2020.02)

(58) Field of Classification Search
CPC ........ G06F 8/65; B60R 16/033; B60W 50/00; B60W 2050/0083; B60W 2510/244; B60W 2556/45; G07C 5/008
USPC ............................................................. 701/2
See application file for complete search history.

(56) References Cited

U.S. PATENT DOCUMENTS

| | | | |
|---|---|---|---|
| 9,904,531 B2 * | 2/2018 | Suzuki | ...................... G06F 8/65 |
| 10,678,530 B2 | 6/2020 | Sangeetha | |
| 2020/0215930 A1 * | 7/2020 | Izumi | ...................... B60R 16/02 |
| 2020/0394031 A1 * | 12/2020 | Kim | .......................... G06F 8/65 |
| 2021/0081192 A1 | 3/2021 | Jeong | |

FOREIGN PATENT DOCUMENTS

| | | |
|---|---|---|
| JP | 2017134506 A | 8/2017 |
| KR | 10-2020-0143882 A | 12/2020 |

\* cited by examiner

*Primary Examiner* — Isaac G Smith
(74) *Attorney, Agent, or Firm* — MORGAN, LEWIS & BOCKIUS LLP (57) ABSTRACT

A device and a method for controlling OTA update of a vehicle, to automatically set an optimal current consumption regardless of a vehicle model and an option for each vehicle model, includes a sensor configured for measuring a current consumption of a battery provided in the vehicle, and a controller that sets an initial current consumption to the vehicle, determines whether the OTA update is possible based on the initial current consumption and an expected over the air (OTA) update time, and determines an optimal current consumption based on the initial current consumption and an average current consumption during the OTA update.

16 Claims, 5 Drawing Sheets

DEVICE AND METHOD FOR CONTROLLING OTA UPDATE OF VEHICLE

CROSS-REFERENCE TO RELATED APPLICATION

The present application is a continuation of U.S. patent application Ser. No. 17/587,893, filed Jan. 28, 2022, which claims priority to Korean Patent Application No. 10-2021-0083397, filed on Jun. 25, 2021, the entire contents of which is incorporated herein for all purposes by this reference.

BACKGROUND OF THE INVENTION

Field of the Invention

The present invention relates to a technology for controlling over the air (OTA) update of electronic control units (ECUs) provided in a vehicle.

Description of Related Art

As parts for a vehicle are rapidly electronalized, types and the number of electronic devices mounted on the vehicle are greatly increased. The electronic devices may be largely used in a power train control system, a body control system, a chassis control system, a vehicle network, a multimedia system, and the like. The power train control system may include an engine control system, an automatic shift control system, and the like. The body control system may include a body electronic part control system, a convenience device control system, a lamp control system, and the like. The chassis control system may include a steering device control system, a brake control system, a suspension control system, and the like. The vehicle network may include a controller area network (CAN), a FlexRay-based network, a media oriented system transport (MOST)-based network, and the like. The multimedia system may include a navigation device system, a telematics system, an infotainment system, and the like.

Such systems and electronic devices forming each of the systems are connected to each other through a vehicle network, and a vehicle network for supporting a function of each of the electronic devices is required. The CAN may support a transmission speed of up to 1 Mbps, and may support automatic re-transmission of collided frames, error detection based on cycle redundancy check (CRC), and the like. The FlexRay-based network may support a transmission speed of up to 10 Mbps, and may support simultaneous transmission of data through two channels, data transmission in a synchronous manner, and the like. The MOST-based network, which is a communication network for high-quality multimedia, may support a maximum transmission speed of 150 Mbps.

In one example, the telematics system, the infotainment system, an improved safety system, and the like of the vehicle require a high transmission speed, system scalability, and the like, but the CAN, the FlexRay-based network, and the like are not able to fully support those. The MOST-based network may support higher transmission speed than the CAN and the FlexRay-based network, but it is expensive to apply the MOST-based network to all networks of the vehicle. Because of such problems, an Ethernet-based network may be considered as the vehicle network. The Ethernet-based network may support bidirectional communication through a pair of windings, and may support a maximum transmission speed of 10 Gbps.

Recently, there is an increasing demand for over-the-air (OTA) update of ECUs provided in the vehicle, and thus, various methods for updating each ECU connected to the vehicle network have been provided.

A capacity ((Ah), Ah=A(current)×h(time)) of a battery consumed in the OTA update is different depending on a model of vehicle and an option for each model of the vehicle. In the present connection, there are more than hundreds of models of vehicles, and there are thousands of detailed models of vehicles when the models of vehicles are classified in detail in consideration of the option mounted on the vehicle. Thus, it is difficult for an operator to set current consumption for the thousands of vehicles like this. Moreover, as an age of the vehicle increases, accuracy of the current consumption decreases, resulting in a problem in that it is impossible to detect whether the OTA update is possible with a high accuracy.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for controlling OTA update of a vehicle which may set an initial current consumption to the vehicle, determine whether the OTA update is possible based on the initial current consumption and an expected OTA update time, and set an optimal current consumption based on the initial current consumption and an average current consumption during the OTA update, automatically setting the optimal current consumption regardless of a vehicle model and an option for each vehicle model, and thus, accurately detecting whether the OTA update is possible.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, an apparatus configured for controlling OTA update of a vehicle includes a sensor configured for measuring a current consumption of a battery provided in the vehicle, and a controller that sets an initial current consumption to the vehicle, determines whether the OTA update is possible based on the initial current consumption and an expected over the air (OTA) update time, and determines an optimal current consumption based on the initial current consumption and an average current consumption during the OTA update.

In various exemplary embodiments of the present invention, the controller may be configured to determine that the OTA update is possible when a value obtained by subtracting a capacity consumption of the battery from a residual capacity of the battery exceeds a reference value.

In various exemplary embodiments of the present invention, the reference value may be a minimum capacity of the battery facilitating start of the vehicle.

In various exemplary embodiments of the present invention, the controller may collect residual capacity information of the battery through a vehicle network.

In various exemplary embodiments of the present invention, the controller may be configured to determine the capacity consumption of the battery by multiplying the initial current consumption by the expected OTA update time.

In various exemplary embodiments of the present invention, the controller may be configured to determine the average current consumption during the OTA update based on the current consumption measured by the sensor.

In various exemplary embodiments of the present invention, the controller may be configured to determine the optimal current consumption based on [Mathematical Equation 1] below.

In various exemplary embodiments of the present invention, the weight may have a value ranging from 0 to 1.

In various exemplary embodiments of the present invention, the controller may be configured to determine a more optimized current consumption as a number of times to determine whether the OTA update is possible increases.

According to various aspects of the present invention, a method for controlling OTA update of a vehicle includes setting, by a controller, an initial current consumption to the vehicle, determining, by the controller, whether the OTA update is possible based on the initial current consumption and an expected over the air (OTA) update time, measuring, by a sensor, a current consumption of a battery provided in the vehicle, and determining, by the controller, an optimal current consumption based on the initial current consumption and an average current consumption during the OTA update.

In various exemplary embodiments of the present invention, the determining of whether the OTA update is possible may include determining that the OTA update is possible when a value obtained by subtracting a capacity consumption of the battery from a residual capacity of the battery exceeds a reference value.

In various exemplary embodiments of the present invention, the determining of whether the OTA update is possible may further include collecting residual capacity information of the battery through a vehicle network.

In various exemplary embodiments of the present invention, the determining of whether the OTA update is possible may further include determining the capacity consumption of the battery by multiplying the initial current consumption by the expected OTA update time.

In various exemplary embodiments of the present invention, the determining of the optimal current consumption may include determining the average current consumption during the OTA update based on the current consumption measured by the sensor.

In various exemplary embodiments of the present invention, the determining of the optimal current consumption may include determining the optimal current consumption based on [Mathematical Equation 1] below.

In various exemplary embodiments of the present invention, the determining of the optimal current consumption may include determining a more optimized current consumption as a number of times to determine whether the OTA update is possible increases.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of the related known configuration or function will be omitted when it is determined that it interferes with the understanding of the exemplary embodiment of the present invention.

In describing the components of the exemplary embodiment according to various exemplary embodiments of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Figure 1:
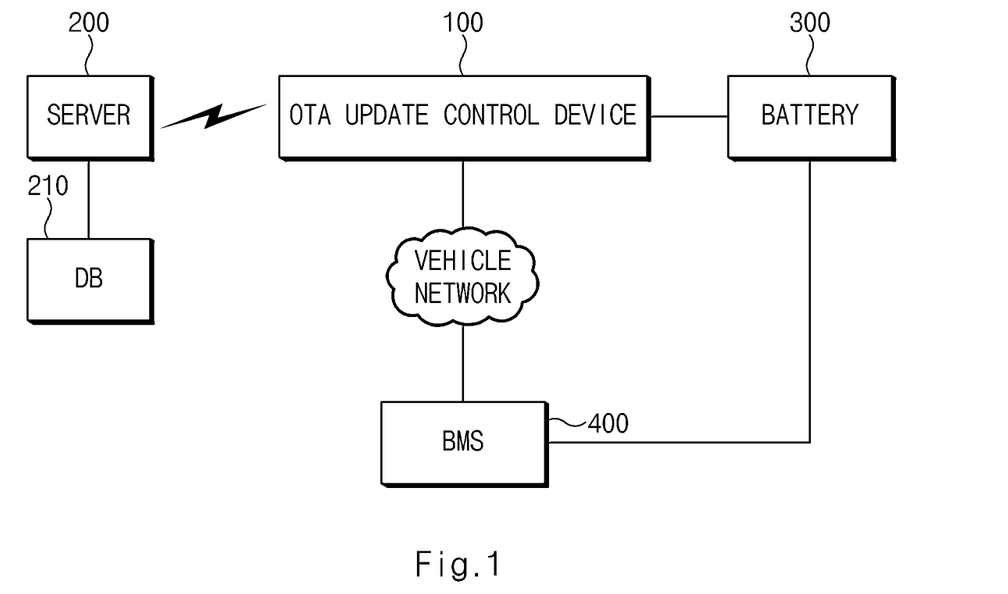
FIG. 1 is an exemplary view of a system for controlling OTA update of a vehicle to which various exemplary embodiments of the present invention is applied.

FIG. 1 is an exemplary view of a system for controlling OTA update of a vehicle to which various exemplary embodiments of the present invention is applied.

As shown in FIG. 1, an OTA update control system of a vehicle to which various exemplary embodiments of the present invention is applied may include an OTA update control device 100, a server 200, a DB 210, a battery 300, and a BMS 400.

The OTA update control device 100 may set an initial current consumption to the vehicle, determine whether OTA update is possible based on the initial current consumption and an expected OTA update time, and set an optimal current consumption based on the initial current consumption and an average current consumption during the OTA update, automatically setting the optimal current consumption regardless of a vehicle model and an option for each vehicle model, and thus, accurately detecting whether the OTA update is possible.

The server 200 may store update data corresponding to each ECU provided in the vehicle in the database (DB) 210 and manage the update data.

The server 200 may manage update data corresponding to an ID and version information of software stored in the DB 210. In the present connection, the server 200 may store the update data corresponding to the ID and the version information of the software in the DB 210.

The server 200 may communicate with the OTA update control device 100 of the vehicle through a wireless communication network. The server 200 may transmit an update table in which an ID and version information of software provided in each ECU of the vehicle are recorded for each version of the vehicle to the OTA update control device 100. Furthermore, the server 200 may transmit update data of each ECU provided in the vehicle to the OTA update control device 100.

The battery 300 may supply power to an electric load provided in the vehicle.

The battery management system (BMS) 400, which is a module for managing an overall state of the battery 300, may provide residual capacity information of the battery 300 to the OTA update control device 100 through the vehicle network.

Figure 2:
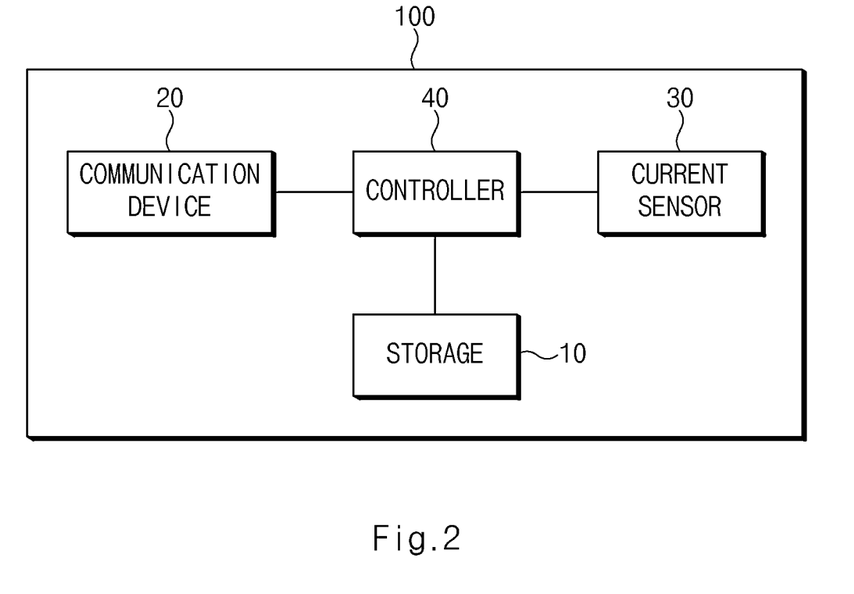
FIG. 2 is a block diagram for a device configured for controlling OTA update of a vehicle according to various exemplary embodiments of the present invention.

FIG. 2 is a block diagram for a device configured for controlling OTA update of a vehicle according to various exemplary embodiments of the present invention.

As shown in FIG. 2, the OTA update control device 100 of the vehicle according to various exemplary embodiments of the present invention may include storage 10, a communication device 20, a current sensor 30, and a controller 40. In the present connection, components may be coupled to each other and implemented as one component, or some components may be omitted depending on a scheme of implementing the OTA update control device 100 of the vehicle according to various exemplary embodiments of the present invention.

Each of the components will be described. First, the storage 10 may store various logics, algorithms, and programs required in a process of setting the initial current consumption to the vehicle, determining whether the OTA update is possible based on the initial current consumption and the expected OTA update time, and setting the optimal current consumption based on the initial current consumption and the average current consumption during the OTA update.

Such storage 10 may include at least one type of recording media (storage media) of a memory of a flash memory type, a hard disk type, a micro type, a card type (e.g., a secure digital card (SD card) or an eXtream digital card (XD card)), and the like, and a memory of a random access memory (RAM), a static RAM (SRAM), a read-only memory (ROM), a programmable ROM (PROM), an electrically erasable PROM (EEPROM), a magnetic RAM (MRAM), a magnetic disk, and an optical disk type.

The communication device 20, which is a module that provides an interface for communication with the server 200, may download the update data (e.g., firmware) applied to each ECU from the server 200.

Such communication device 20 may include at least one of a mobile communication module, a wireless Internet module, and/or a short-range communication module.

The mobile communication module may receive the update data through a mobile communication network built based on technical standards or communication schemes for mobile communication (e.g., a global system for mobile communication (GSM)), a code division multi access (CDMA), a code division multi access 2000 (CDMA2000), an enhanced voice-data optimized or enhanced voice-data only (EV-DO), a wideband CDMA (WCDMA), a high speed downlink packet access (HSDPA), a high speed uplink packet access (HSUPA), a long term evolution (LTE), a long term evolution-advanced (LTEA), and the like).

The wireless Internet module, which is a module for wireless Internet access, may receive the update data through a wireless LAN (WLAN), a wireless-fidelity (Wi-Fi), a wireless fidelity (Wi-Fi) Direct, a digital living network alliance (DLNA), a wireless broadband (WiBro), a Worldwide Interoperability for Microwave Access (WiMAX), a high speed downlink packet access (HSDPA), a high speed uplink packet access (HSUPA), a long term evolution (LTE), a long term evolution-advanced (LTE-A), and the like.

The short-range communication module may support short-range communication using at least one of technologies of a Bluetooth™, a radio frequency identification (RFID), an infrared data association (IrDA), an ultra wideband (UWB), a ZigBee, a near field communication (NFC), and a wireless universal serial bus (Wireless USB).

The current sensor 30 may periodically measure a current consumption of the battery 300. The current sensor 30 may periodically measure the current consumption while the OTA update is performed.

The controller 40 may perform overall control such that each of the components may normally perform a function thereof. Such controller 40 may be implemented in a form of hardware, software, or a combination of the hardware and the software. The controller 40 may be implemented as a microprocessor, but may not be limited thereto.

The controller 40 may perform various control in a process of setting the initial current consumption to the vehicle, determining whether the OTA update is possible based on the initial current consumption and the expected OTA update time, and setting the optimal current consumption based on the initial current consumption and the average current consumption during the OTA update.

As various exemplary embodiments of the present invention, the controller 40 may set an initial current consumption of 20 A to a large vehicle, set an initial current consumption of 15 A to a medium-sized vehicle, and set an initial current consumption of 10 A to a small vehicle.

The controller 40 may determine a capacity consumption (Ah=A(current)×h(time)) of the battery 300 based on the initial current consumption and the expected OTA update time.

The controller 40 may be connected to the vehicle network, and may collect the residual capacity information of the battery 300 through the vehicle network. A residual capacity of the battery 300 may be detected through the residual capacity information.

When a value obtained by subtracting the capacity consumption of the battery 300 from the residual capacity of the battery 300 exceeds a reference value, the controller 40 may determine that OTA update is possible. In the present connection, the reference value may mean a minimum capacity of the battery 300 that enables start of the vehicle.

The controller 40 may determine an average current consumption $I_A$ while the OTA update is performed based on the current consumption measured by the current sensor 30.

The controller 40 may determine the optimal current consumption based on the average current consumption $I_A$ and the initial current consumption. In the present connection, the controller 40 may determine an optimal current consumption "I" based on [Equation 1] below as an example.

$$I = (I_A \times W) + (I_S \times (1 - W)) \quad \text{[Mathematical Equation 1]}$$

Here, "I" represents the optimal current consumption, $I_A$ represents the average current consumption, $I_S$ represents the initial current consumption, and "W" (a value in a range from 0 to 1) represents a weight.

For example, when the initial current consumption $I_S$ is 15 A, the average current consumption $I_A$ is 10 A, and the weight W is 0.5, the optimal current consumption "I" becomes 12.5 A. The optimal current consumption of 12.5 A thus determined is stored as a substitute for the initial current consumption of 15 A. That is, the controller 40 deletes 15 A, which is the initial current consumption, and stores 12.5 A as the initial current consumption.

As such OTA update process is repeated, the more optimized current consumption "I" is set as the initial current consumption Is, so that the controller 40 may detect whether the OTA update is possible with higher accuracy.

Figure 3:
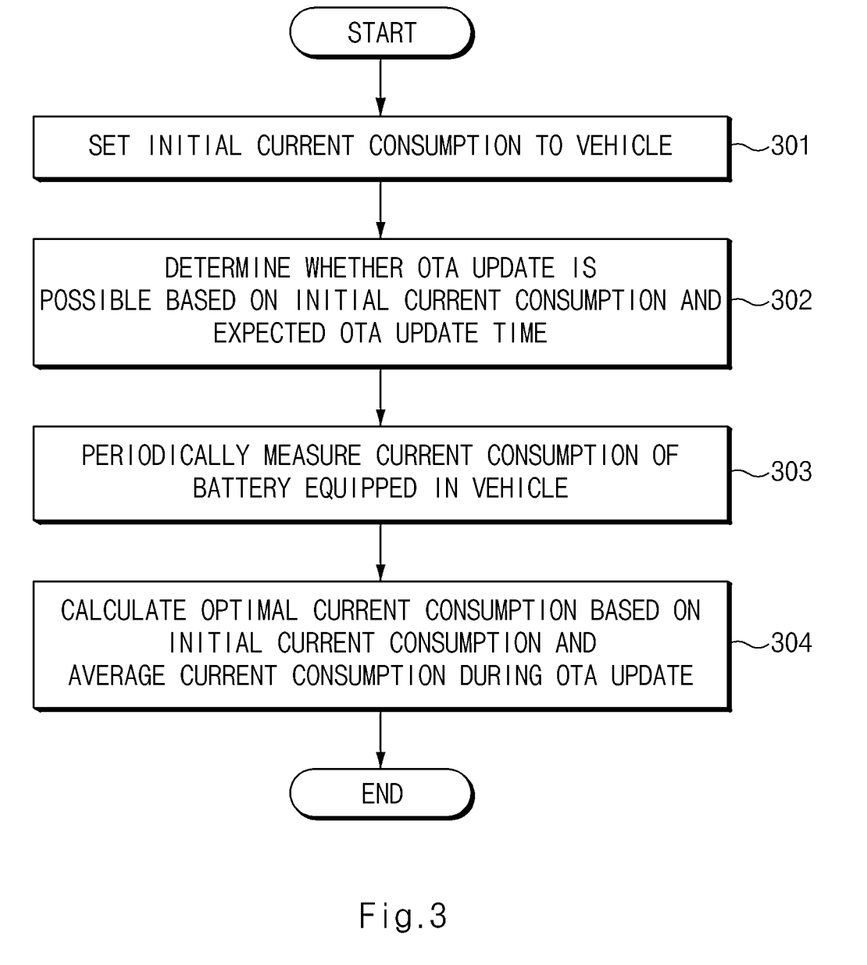
FIG. 3 is an overall flowchart of a method for controlling OTA update of a vehicle according to various exemplary embodiments of the present invention.

FIG. 3 is an overall flowchart of a method for controlling OTA update of a vehicle according to various exemplary embodiments of the present invention.

First, the controller 40 sets the initial current consumption to the vehicle (301).

Thereafter, the controller 40 determines whether the OTA update is possible based on the initial current consumption and the expected over the air (OTA) update time (302). In the present connection, the controller 40 may obtain the expected OTA update time from the OTA update data.

Thereafter, the sensor 30 periodically measures the current consumption of the battery provided in the vehicle (303).

Thereafter, the controller 40 determines the optimal current consumption based on the initial current consumption and the average current consumption during the OTA update (304). In the present connection, the controller 40 may set the determined optimal current consumption as the initial current consumption. That is, an optimal current consumption value may be stored as an initial current consumption value.

Figure 4:
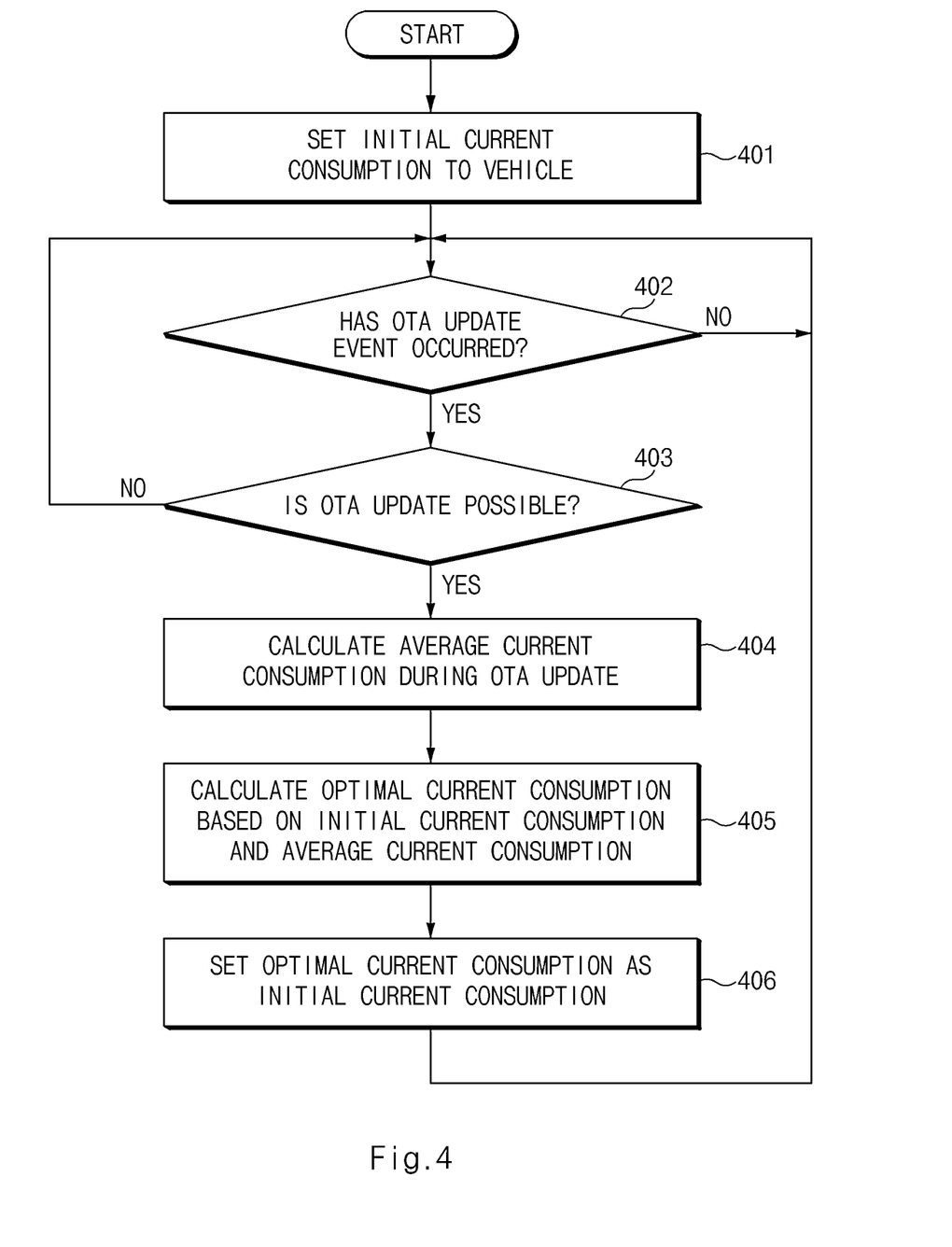
FIG. 4 is a detailed flowchart of a method for controlling OTA update of a vehicle according to various exemplary embodiments of the present invention.

FIG. 4 is a detailed flowchart of a method for controlling OTA update of a vehicle according to various exemplary embodiments of the present invention.

First, the controller 40 sets the initial current consumption to the vehicle (401).

Thereafter, the controller 40 determines whether an OTA update event has occurred (402).

When the OTA event has occurred as the determination result (402), the controller 40 determines whether the OTA update is possible based on the initial current consumption and the expected OTA update time (403).

Thereafter, when the OTA update is possible, the controller 40 determines the average current consumption of the battery 300 while the OTA update is performed based on the current consumption of the battery 300 periodically measured by the current sensor 30 (404).

Thereafter, the controller 40 determines the optimal current consumption based on the initial current consumption and the average current consumption (405). In the present connection, the controller 40 may determine the optimal current consumption based on Mathematical Equation 1 above.

Thereafter, the controller 40 sets the optimal current consumption as the initial current consumption (406).

Figure 5:
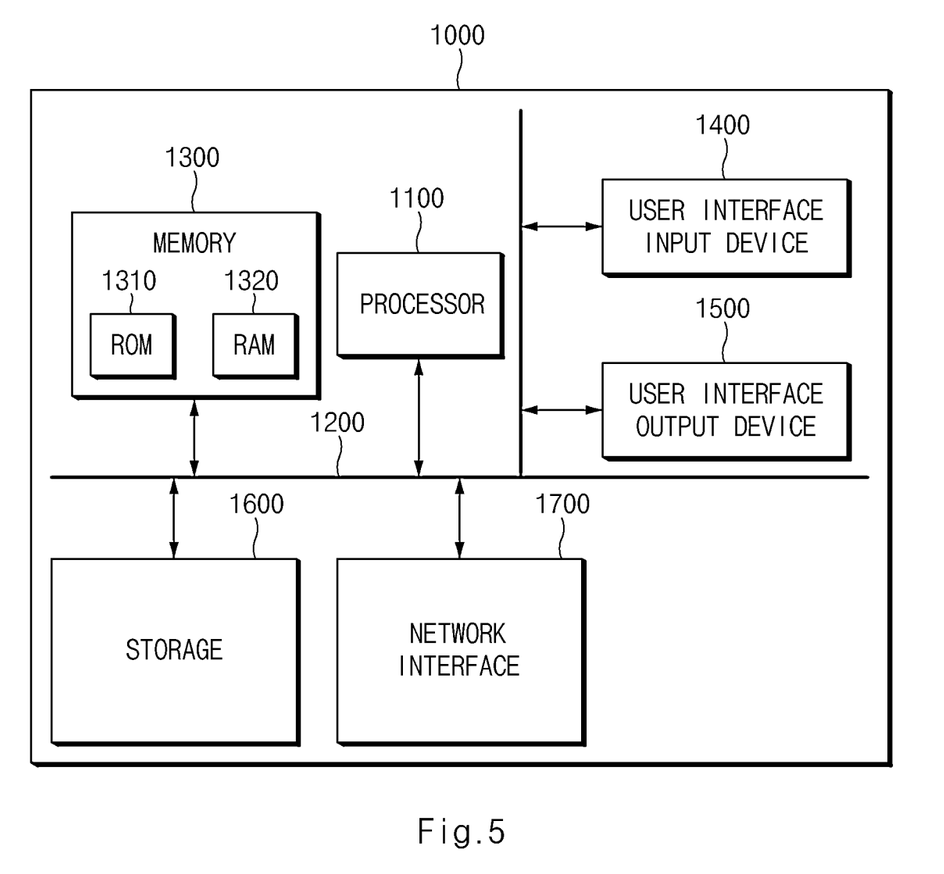
FIG. 5 is a block diagram showing a computing system for executing a method for controlling OTA update of a vehicle according to various exemplary embodiments of the present invention.

FIG. 5 is a block diagram showing a computing system for executing a method for controlling OTA update of a vehicle according to various exemplary embodiments of the present invention.

With reference to FIG. 5, the method for updating the ECU of the vehicle according to various exemplary embodiments of the present invention described above may also be implemented with a computing system. A computing system 1000 may include at least one processor 1100, a memory 1300, a user interface input device 1400, a user interface output device 1500, storage 1600, and a network interface 1700 connected via a system bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD), a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present invention, and various modifications and changes may be made by those skilled in the art without departing from the essential characteristics of the present invention.

Therefore, the exemplary embodiments included in various exemplary embodiments of the present invention are not intended to limit the technical idea of the present invention but to illustrate the present invention, and the scope of the technical idea of the present invention is not limited by the embodiments. The scope of the present invention may be construed as being covered by the scope of the appended claims, and all technical ideas falling within the scope of the claims may be construed as being included in the scope of the present invention.

The device and the method for controlling the OTA update of the vehicle according to various exemplary embodiments of the present invention as described above may set the initial current consumption to the vehicle, determine whether the OTA update is possible based on the initial current consumption and the expected OTA update time, and set the optimal current consumption based on the initial current consumption and the average current consumption during the OTA update, automatically setting the optimal current consumption regardless of the vehicle model and the option for each vehicle model, and thus, accurately detecting whether the OTA update is possible.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling over the air (OTA) update of a vehicle, the apparatus comprising:
   a sensor configured for measuring a current consumption of a battery provided in the vehicle; and
   a controller configured to:
   determine an initial current consumption of the battery based on a type of the vehicle;
   determine whether the OTA update is possible based on the initial current consumption and an expected OTA update time;
   determine an optimal current consumption based on the initial current consumption and an average current consumption during the OTA update performed by the controller; and
   store the optimal current consumption as the initial current consumption.

2. The apparatus of claim 1, wherein the controller is configured to determine that the OTA update is possible when the controller concludes that a value obtained by subtracting a capacity consumption of the battery due to the OTA update from a residual capacity of the battery exceeds a reference value.

3. The apparatus of claim 2, wherein the reference value is a minimum capacity of a battery enabling start of the vehicle.

4. The apparatus of claim 2, wherein the controller is configured to collect residual capacity information of the battery through a vehicle network.

5. The apparatus of claim 2, wherein the controller is configured to determine the capacity consumption of the battery by multiplying the initial current consumption by the expected OTA update time.

6. The apparatus of claim 1, wherein the controller is configured to determine the average current consumption during the OTA update based on the current consumption measured by the sensor.

7. The apparatus of claim 1, wherein the controller is configured to determine the optimal current consumption based on [Mathematical Equation 1] below:

$$I = (I_A \times W) + (I_S \times (1 - W)) \quad \text{[Mathematical Equation 1]}$$

wherein I represents the optimal current consumption, $I_A$ represents the average current consumption, $I_S$ represents the initial current consumption, and W represents a weight.

8. The apparatus of claim 7, wherein the weight has a value ranging from 0 to 1.

9. A method for controlling over the air (OTA) update of a vehicle, the method comprising:
   determining, by a controller, an initial current consumption corresponding to a type of the vehicle;
   determining, by the controller, whether the OTA update is possible based on the initial current consumption and an OTA update time;
   measuring, by a sensor, a current consumption of a battery provided in the vehicle;
   determining, by the controller, an optimal current consumption based on the initial current consumption and an average current consumption during the OTA update performed by the controller; and
   storing, by the controller, the optimal current consumption as the initial current consumption.

10. The method of claim 9, wherein the determining of whether the OTA update is possible includes:
    determining that the OTA update is possible when the controller concludes that a value obtained by subtracting a capacity consumption of the battery due to the OTA update from a residual capacity of the battery exceeds a reference value.

11. The method of claim 10, wherein the reference value is a minimum capacity of a battery enabling start of the vehicle.

12. The method of claim 10, wherein the determining of whether the OTA update is possible further includes:
    collecting residual capacity information of the battery through a vehicle network.

13. The method of claim 10, wherein the determining of whether the OTA update is possible further includes:

determining the capacity consumption of the battery by multiplying the initial current consumption by the expected OTA update time.

14. The method of claim 9, wherein the determining of the optimal current consumption includes:
determining the average current consumption during the OTA update based on the current consumption measured by the sensor.

15. The method of claim 9, wherein the determining of the optimal current consumption includes:
determining the optimal current consumption based on [Mathematical Equation 1] below:

$$I = (I_A \times W) + (I_S \times (1 - W)) \qquad \text{[Mathematical Equation 1]}$$

wherein I represents the optimal current consumption, $I_A$ represents the average current consumption, $I_S$ represents the initial current consumption, and W represents a weight.

16. The method of claim 15, wherein the weight has a value ranging from 0 to 1.

* * * * *